Patented May 30, 1933

1,911,867

UNITED STATES PATENT OFFICE

HARRY C. YOUNG, OF WOOSTER, OHIO, ASSIGNOR TO THE GRASSELLI CHEMICAL COMPANY, OF CLEVELAND, OHIO, A CORPORATION OF DELAWARE

COMBINED FUNGICIDE AND INSECTICIDE

No Drawing. Application filed October 1, 1930. Serial No. 485,821.

It has in late years been shown that the beneficial action of sulfur in fighting cryptogamic diseases of plants is mainly, if not entirely due to the presence in minute amounts in the sulfur of oxidation products of the type of polythionic acids.

These oxidation products are not very stable, and their existence in sulfur dusts is often detrimentally affected by the presence of other substances in the dust. It is, for instance, known that admixtures of lead or calcium arsenate to sulfur dusts very materially affect the fungicidal properties of the dusts, and I believe that these arsenicals either prevent formation of polythionic acids or speed up their decomposition when formed.

I have found that the fungicidal properties of sulfur persists entirely in mixtures of sulfur and manganese arsenates, and my invention comprises novel compositions of matter having fungicidal and insecticidal properties, said compositions comprising mixtures of finely divided sulfur with finely divided manganese arsenate.

It is also known that the active polythionic acids form particularly under the conditions when sulfur dusts as applied as fungicides adhere to the plants, but that under these same conditions further oxidation or decomposition of the polythionic acids takes place, which may explain the irregularities sometimes noted in the fungicidal action of sulfur dusts.

I have shown in my co-pending application, Serial No. 485,822, filed on even date herewith, that the irregular fungicidal effect observed in sulfur dusts can be overcome if the dusts contain small amounts of an inorganic amphoteric substance when said dusts are applied as fungicides and adhere to the plants.

I have further found that the presence of manganese arsenates in sulfur dusts stabilized by said amphoteric substances does in no way impair the action of said amphoteric substances and I contemplate in a preferred embodiment of my invention to prepare compositions of matter comprising finely divided sulfur, a manganese arsenate and a substance of an amphoteric nature.

From these observations I believe that manganese arsenates are entirely inert as far as the fungicidal effect of sulfur is concerned, which is quite unique and unexpected when compared with prior experience on mixtures of sulfur and arsenical insecticides. My novel compositions of matter provide, therefore, a very useful manner of simultaneously protecting plants from insects and fungous diseases by the combined use of two of the best known agents, that is to say, sulfur and an arsenical, which combination, so far as my knowledge goes, has never been successfully achieved before my invention. The full beneficial effect of manganese arsenates as insecticides is obtained with compositions of low water soluble $As_2O_5$. Such insecticides are conveniently prepared by reaction upon a manganese dioxide material with arsenous acid, under steam pressures of about 80 pounds per square inch, and subsequently reacting with an alkaline agent, the arsenate of which is difficultly soluble in water, upon the manganese arsenates originally formed. Such manganese arsenates contain less than 1% water soluble $As_2O_5$, and the manganese arsenates of this type are preferred in my novel compositions of matter.

My novel dusts are mainly intended for the control of cryptogamic diseases on plants. I prefer therefor to prepare my mixtures in such a way that they contain a major amount of sulfur. A composition containing about 90% of finely divided sulfur and about 10% finely ground manganese arsenate of low water soluble $As_2O_5$ content when dusted on plants gives an excellent control of fungous diseases under ordinary conditions. The proportions of the two ingredients can, of course, be varied within wide limits, depending upon the particular infections in the field to be treated. Dusts containing increased amounts of manganese arsenate will be beneficial on fields heavily infected with insects without loss in the improved fungicidal effect of the sulfur, whereas sulfur dusts containing less than 10% manganese arsenate can be used to advantage when harmful insects are only sparsely present.

My co-pending application cited above discloses that I prefer to stabilize fungicidal sulfur by the admixture thereto of small amounts of substances, such as uncalcined zinc or aluminum oxide, zinc and aluminum hydroxide, basic zinc and aluminum salts, anhydrous zinc and aluminum sulfate, or other zinc and aluminum salts in which zinc and aluminum are the positive ions and which are non-hygroscopic. Only small amounts of said substances, in certain instances, even less than 1%, are required to develop the full insecticidal properties of the sulfur manganese arsenate compositions. 5% of such stabilizing substances have in all instances been found sufficient, but smaller or larger amounts could be used as well.

To make my novel composition of matter useful as combined insecticides and fungicides, it is necessary that all ingredients be in a finely divided state. Products the majority of which passes through a 200 mesh screen, are ordinarily sufficiently divided for my purposes.

My novel compositions are intended to be used as dusts for application in a dry form. This method finds great favor in agriculture over applications of liquid sprays. It is essential in such dry dusts that the components be in a very finely divided form and that they do not segregate on storage or during transportation. These conditions are entirely satisfied by my novel compositions. It is furthermore necessary that the dusts adhere, or stick firmly to the plants. In this respect also the addition of non-hygroscopic, finely divided zinc or aluminum compounds to the sulfur manganese arsenate mixtures has proven beneficial, as it improves the adhesiveness of the dusts to the plants.

My novel compositions of matter are particularly intended for use as dusts on fruit trees and flower plants. Excellent control has, for instance, been obtained on black spot, mildew and leaf eating insects on roses. Apple scab and peach leaf curl are likewise easily controlled by application of dusts comprising sulfur and manganese arsenate with or without the presence of amphoteric substances in the dust.

The application of my novel dusts to plants is made in the usual well known manner and as the mode of application will vary with the season, weather conditions, and depends on so many factors well known to the horticulturists, they need not be described in detail here.

The control of fungi diseases as obtained by the use of my novel dust compositions is illustrated by the following results of various field tests:

*Apple scab*

| Material used | Total scab infection after treatment in percent |
|---|---|
| 1. Dusting sulfur 300 mesh | 23.9 |
| 96–4 sulfur-manganese arsenate | 6.9 |
| Check, no dusting | 98.5 |
| 2. Commercial dusting sulfur | 22.0 |
| 90–10 sulfur-manganese arsenate | 17.5 |
| Check, no dusting | 98.0 |
| 3. Commercial dusting sulfur | 4.0 |
| 90–10 sulfur-manganese arsenate | 1.1 |
| 4. 85–10–5 sulfur manganese arsenate-aluminum hydroxide | 38.9 |
| 90–10 sulfur-manganese arsenate | 46.0 |
| Check, no dusting | 100. |

*Peach leaf curl*

| Material used | Total infection after treatment in percent |
|---|---|
| 85–10–5 sulfur-manganese arsenate-and aluminum sulfate | 25–30 |
| 85–10–5 sulfur-manganese arsenate and zinc sulfate | 15 |
| Check, no dusting | 90 |

This is the first successful control of peach leaf curl known to me as having been obtained with a sulfur dust.

I claim:

1. As a composition of matter a fungicidal and insecticidal dust consisting of sulfur, a manganese arsenate and a substance which under conditions existing when said composition of matter adheres as a dust to plants is of an amphoteric nature.

2. As a composition of matter a fungicidal and insecticidal dust consisting of sulfur, manganese arsenate and a substance selected from the group of substances consisting of the oxides, hydroxides, basic salts and non-hygroscopic salts of metals, the hydroxides of which are of an amphoteric nature.

3. As a composition of matter a fungicidal and insecticidal dust consisting of sulfur, manganese arsenate and a substance selected from the group of substances consisting of the oxides, hydroxides, basic salts and non-hygroscopic salts, in which zinc and aluminum are the anion, of zinc and aluminum.

4. As a composition of matter a fungicidal and insecticidal dust, consisting of sulfur, manganese arsenate and anhydrous aluminum sulfate.

5. As a composition of matter a fungicidal and insecticidal dust consisting of sulfur, manganese arsenate and aluminum hydroxide.

6. As a composition of matter a fungicidal and insecticidal dust consisting of sulfur, manganese arsenate and a non-hygroscopic zinc compound, which under conditions existing when said composition of matter is applied to and adheres as a dust to plants, is of an amphoteric nature.

In testimony whereof, I affix my signature.

HARRY C. YOUNG.